(12) United States Patent
Nilsson et al.

(10) Patent No.: US 10,724,460 B2
(45) Date of Patent: Jul. 28, 2020

(54) METHOD AND SYSTEM FOR TREATMENT OF AN EXHAUST GAS STREAM

(71) Applicant: Scania CV AB, Södertälje (SE)

(72) Inventors: Magnus Nilsson, Årsta (SE); Henrik Birgersson, Stockholm (SE)

(73) Assignee: Scania CV AB, Södertälje (SE)

( * ) Notice: Subject to any disclaimer, the term of this patent is extended or adjusted under 35 U.S.C. 154(b) by 23 days.

(21) Appl. No.: 15/750,162

(22) PCT Filed: Aug. 25, 2016

(86) PCT No.: PCT/SE2016/050795
§ 371 (c)(1),
(2) Date: Feb. 2, 2018

(87) PCT Pub. No.: WO2017/034464
PCT Pub. Date: Mar. 2, 2017

(65) Prior Publication Data
US 2018/0223759 A1    Aug. 9, 2018

(30) Foreign Application Priority Data

Aug. 27, 2015    (SE) ..................... 1551107

(51) Int. Cl.
*F01N 3/023*    (2006.01)
*F01N 3/035*    (2006.01)
(Continued)

(52) U.S. Cl.
CPC ......... *F02D 41/146* (2013.01); *B01D 53/944* (2013.01); *B01D 53/9418* (2013.01);
(Continued)

(58) Field of Classification Search
CPC ........ F01N 3/0231; F01N 3/035; F01N 3/106; F01N 3/2066; F01N 11/002;
(Continued)

(56) References Cited

U.S. PATENT DOCUMENTS 5,120,695 A    6/1992    Blumrich et al.
5,239,860 A    8/1993    Harris et al.
(Continued)

FOREIGN PATENT DOCUMENTS

DE    3733501 A1    4/1989
DE    102006031650 A1    1/2008
(Continued)

OTHER PUBLICATIONS

Botar-Jid, Claudiu Cristian (2007)—Selective catalytic reduction of nitrogen oxides with ammonia in forced unsteady state reactors—Case based reasoning and mathematical model simulation reasoning; Retrieved online from http://urn.fi/URN:ISBN:978-952-214-469-0; p. 3, second paragraph.
(Continued)

*Primary Examiner* — Audrey K Bradley
(74) *Attorney, Agent, or Firm* — Moore & Van Allen PLLC; W. Kevin Ransom

(57) ABSTRACT

An exhaust treatment system and method for the treatment of an exhaust stream from a combustion engine are provided. A first oxidation of compounds comprising one or more of nitrogen, carbon and hydrogen in the exhaust stream is carried out by a first oxidation catalyst. Further, a value (NO2_1/NOx_1)det for a ratio between a first amount of nitrogen dioxide and a first amount of nitrogen oxides leaving said first oxidation catalyst is determined. Active control of at least one parameter related to the combustion engine is carried out, based on the determined value, so that the ratio is impacted. A first additive is supplied into the exhaust stream, following which a first reduction of the first amount of nitrogen oxides is carried out through a catalytic reaction in a catalytic filter, which consists of a particulate filter with an at least partly catalytic coating with reduction characteristics. The catalytic filter is arranged for catching
(Continued)

and oxidizing of soot particles, and to carry out the first reduction of the first amount of nitrogen oxides using the first additive.

32 Claims, 4 Drawing Sheets

(51) Int. Cl.
F01N 3/20 (2006.01)
F01N 11/00 (2006.01)
F01N 13/00 (2010.01)
B01D 53/94 (2006.01)
F02D 41/14 (2006.01)
F02D 41/40 (2006.01)
F02D 41/02 (2006.01)
F01N 3/10 (2006.01)
F02M 26/00 (2016.01)
F02D 41/00 (2006.01)

(52) U.S. Cl.
CPC ..... B01D 53/9477 (2013.01); B01D 53/9495 (2013.01); F01N 3/0231 (2013.01); F01N 3/035 (2013.01); F01N 3/106 (2013.01); F01N 3/2066 (2013.01); F01N 11/002 (2013.01); F01N 11/007 (2013.01); F01N 13/009 (2014.06); F01N 13/0093 (2014.06); F02D 41/0052 (2013.01); F02D 41/0235 (2013.01); F02D 41/1462 (2013.01); F02D 41/1465 (2013.01); F02D 41/40 (2013.01); F02M 26/00 (2016.02); B01D 2255/904 (2013.01); F01N 2430/00 (2013.01); F01N 2430/08 (2013.01); F01N 2510/06 (2013.01); F01N 2560/026 (2013.01); F01N 2560/06 (2013.01); F01N 2590/11 (2013.01); F01N 2610/02 (2013.01); F01N 2610/146 (2013.01); F01N 2900/0416 (2013.01); F01N 2900/08 (2013.01); F02D 2250/36 (2013.01); Y02T 10/24 (2013.01)

(58) Field of Classification Search
CPC .. F01N 11/007; F01N 13/009; F01N 13/0093; F01N 2430/00; F01N 2430/08; F01N 2510/06; F01N 2560/026; F01N 2560/06; F01N 2590/11; F01N 2610/02; F01N 2610/146; F01N 2900/0416; F01N 2900/08; F02D 41/0052; F02D 41/0235; F02D 41/146; F02D 41/1462; F02D 41/1465; F02D 41/40; F02D 2250/36; B01D 53/9418; B01D 53/944; B01D 53/9477; B01D 53/9495; B01D 2255/904; F02M 26/00; Y02T 10/24
See application file for complete search history.

(56) References Cited

U.S. PATENT DOCUMENTS

| | | | |
|---|---|---|---|
| 8,544,260 | B2 | 10/2013 | Boorse et al. |
| 9,670,855 | B2 | 6/2017 | Dickson et al. |
| 2004/0040289 | A1 | 3/2004 | Mazur et al. |
| 2004/0098979 | A1 | 5/2004 | Hammerle et al. |
| 2005/0069476 | A1 | 3/2005 | Blakeman et al. |
| 2005/0232830 | A1 | 10/2005 | Bruck |
| 2006/0010857 | A1 | 1/2006 | Hu et al. |
| 2006/0039843 | A1 | 2/2006 | Patchett et al. |
| 2007/0122317 | A1 | 5/2007 | Driscoll et al. |
| 2007/0150154 | A1 | 6/2007 | Lenz |
| 2008/0060348 | A1 | 3/2008 | Robel et al. |
| 2009/0031702 | A1 | 2/2009 | Robel |
| 2009/0035194 | A1 | 2/2009 | Robel et al. |
| 2009/0035195 | A1 | 2/2009 | Robel |
| 2009/0193794 | A1 | 8/2009 | Robel et al. |
| 2010/0024393 | A1 | 2/2010 | Chi et al. |
| 2010/0175372 | A1 | 7/2010 | Lambert et al. |
| 2010/0199634 | A1* | 8/2010 | Heaton ............. B01D 53/944 60/274 |
| 2010/0252737 | A1 | 10/2010 | Fournel et al. |
| 2010/0319320 | A1 | 12/2010 | Mital et al. |
| 2011/0162347 | A1 | 7/2011 | Katare et al. |
| 2011/0211193 | A1 | 9/2011 | Saveliev et al. |
| 2011/0271664 | A1 | 11/2011 | Boorse et al. |
| 2011/0295484 | A1 | 12/2011 | L'Henoret |
| 2011/0313635 | A1 | 12/2011 | Blanc et al. |
| 2012/0117954 | A1 | 5/2012 | Yasui et al. |
| 2012/0255286 | A1 | 10/2012 | Matsunaga et al. |
| 2013/0078173 | A1 | 3/2013 | Cox |
| 2013/0116881 | A1 | 5/2013 | Bogema et al. |
| 2013/0232958 | A1 | 9/2013 | Ancimer et al. |
| 2013/0289857 | A1 | 10/2013 | Schmitt et al. |
| 2014/0052353 | A1 | 2/2014 | Sujan et al. |
| 2014/0056789 | A1 | 2/2014 | Mussmann et al. |
| 2014/0165557 | A1* | 6/2014 | Mohammed ........ F02D 41/0275 60/602 |
| 2014/0229010 | A1 | 8/2014 | Farquharson et al. |
| 2015/0020506 | A1 | 1/2015 | Johansen |
| 2015/0023853 | A1 | 1/2015 | Wittrock et al. |
| 2015/0033715 | A1 | 2/2015 | Markatou et al. |
| 2015/0131093 | A1 | 5/2015 | Saptari |
| 2015/0143798 | A1 | 5/2015 | Lee |
| 2015/0204226 | A1 | 7/2015 | Moore |
| 2015/0218991 | A1 | 8/2015 | Chavannavar |
| 2015/0231564 | A1 | 8/2015 | Wittrock et al. |
| 2015/0231565 | A1 | 8/2015 | Wittrock et al. |
| 2015/0337702 | A1 | 11/2015 | Ettireddy et al. |
| 2016/0084185 | A1* | 3/2016 | Theis .................. F02D 41/064 701/105 |
| 2016/0201533 | A1 | 7/2016 | Upadhyay et al. |

FOREIGN PATENT DOCUMENTS

| | | | |
|---|---|---|---|
| DE | 102008026191 A1 | 1/2009 | |
| DE | 102009049521 A1 | 7/2010 | |
| DE | 102009038835 A1 | 3/2011 | |
| DE | 102010050312 A1 | 5/2012 | |
| DE | 102012201809 A1 | 9/2012 | |
| DE | 102014019427 A1 | 8/2015 | |
| DE | 102015015260 A1 | 6/2017 | |
| EP | 1181531 A1 | 2/2002 | |
| EP | 2390480 A1 | 11/2011 | |
| FR | 2956039 A1 | 8/2011 | |
| GB | 2352651 A | 2/2001 | |
| JP | 2008231950 A * | 10/2008 | ............. F01N 3/035 |
| KR | 20140143145 | 12/2014 | |
| WO | 2006008625 A1 | 1/2006 | |
| WO | 2007104382 A1 | 9/2007 | |
| WO | 2007145548 A1 | 12/2007 | |
| WO | 2008135805 A1 | 11/2008 | |
| WO | 2009017597 A1 | 2/2009 | |
| WO | 2009017639 A1 | 2/2009 | |
| WO | 2011102781 A1 | 8/2011 | |
| WO | 2011133092 A1 | 10/2011 | |
| WO | 2012037342 A1 | 3/2012 | |
| WO | 2013022516 A1 | 2/2013 | |
| WO | 2013095214 A1 | 6/2013 | |
| WO | 2013100846 A1 | 7/2013 | |
| WO | 2014014399 A1 | 1/2014 | |
| WO | 2014016616 A1 | 1/2014 | |
| WO | 2014044318 A1 | 3/2014 | |
| WO | 2014149297 A1 | 9/2014 | |

OTHER PUBLICATIONS

NOx Controls; EPA/452/B-02-001 Section 4—Retrieved online on Jun. 5, 2015 from http://www.epa.gov/ttncatc1/dir1/cs4-2ch2.pdf; pp. 2-6, third paragraph.
International Search Report for PCT/SE2016/050795 dated Nov. 8, 2016.

(56) References Cited

OTHER PUBLICATIONS

Written Opinion of the International Searching Authority for PCT/SE2016/050795 dated Nov. 8, 2016.
Scania CV AB, European Application No. 168397065, Extended European Search Report, dated Jan. 2, 2019.
Scania CV AB, International Application No. PCT/SE2016/050795, International Preliminary Report on Patentability, dated Feb. 27, 2018.
Scania CV AB, Korean Application No. 10-2018-7007502, Office Action, dated May 27, 2019.
Scania CV AB, Korean Application No. 10-2018-7007502, Office Action, dated Nov. 6, 2019.

* cited by examiner

METHOD AND SYSTEM FOR TREATMENT OF AN EXHAUST GAS STREAM

CROSS-REFERENCE TO RELATED APPLICATION(S)

This application is a national stage application (filed under 35 § U.S.C. 371) of PCT/SE2016/050795, filed Aug. 25, 2016 of the same title, which, in turn claims priority to Swedish Application No. 1551107-4, filed Aug. 27, 2015 of the same title; the contents of each of which are hereby incorporated by reference.

FIELD OF THE INVENTION

The present invention relates to a method, an exhaust treatment system, and a computer program product arranged for the treatment of an exhaust stream.

BACKGROUND OF THE INVENTION

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in, for example, vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and/or standards for such applications limit emissions from the combustion engines.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammoniac $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive correlation between nitrogen oxides $NO_x$ produced and fuel efficiency, in other words that an engine, which is permitted to emit more nitrogen oxides $NO_x$, may be induced to consume less fuel, which may yield a higher combustion efficiency. Similarly, there is often a negative correlation between a produced particle mass PM and the fuel efficiency, meaning that an increased emission of particle mass PM from the engine is connected with an increased fuel consumption.

This correlation is the background to the widespread use of exhaust treatment systems comprising an SCR-catalyst, where the intention is the optimization of the engine's fuel consumption and emission of particles, towards a relatively larger amount of nitrogen oxides $NO_x$ produced. A reduction of these nitrogen oxides $NO_x$ is then carried out in the exhaust treatment system, which thus may comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

SUMMARY OF THE INVENTION

To some extent, the performance of the exhaust treatment system may be enhanced by increasing the substrate volumes comprised in the exhaust treatment system, which in particular reduces losses due to uneven distribution of the exhaust flow through the substrate. At the same time, a larger substrate volume provides a greater back pressure, which may counteract gains in fuel efficiency due to the higher conversion degree. Larger substrate volumes also entail an increased cost. It is thus important to be able to use the exhaust treatment system optimally, for example by avoiding over-sizing and/or by limiting the exhaust treatment system's spread in terms of size and/or manufacturing cost.

The function and efficiency for catalysts in general, and for catalyst with reduction characteristics in particular, is dependent, for example, on a ratio between nitrogen dioxide and nitrogen oxides, that is to say the $NO_2/NO_x$-fraction, in the exhausts. The $NO_2/NO_x$-fraction depends, however, on a number factors, such as, for example, how the driver drives the vehicle at a current driving mode. For example, the $NO_2/NO_x$-fraction in the exhausts may depend on the torque requested by a driver and/or by a cruise control, on the appearance of the road section in which the vehicle is located and/or the driving style of the driver. One example of a critical operating mode is a throttle when the exhaust temperature is relatively low. At this operating mode, there is a risk that the value for the ratio $NO_2/NO_x$ becomes too low.

In some conditions regarding the catalyst temperature and flow, i.e. for a certain dwell-time in the catalyst ("Space Velocity"), there is a risk that a non-advantageous fraction of nitrogen dioxides $NO_2$ over nitrogen oxides $NO_x$ is obtained. Specifically, there is a risk that the ratio $NO_2/NO_x$ exceeds 50%, which may constitute a real problem for exhaust purification.

There is a risk that an optimization of the ratio $NO_2/NO_x$ for any of the above mentioned critical operating modes may result in too high a fraction of nitrogen dioxide $NO_2$ in other operating modes. This higher fraction of nitrogen dioxides $NO_2$ results in a greater volume requirement for the catalyst with reduction characteristics, and/or in a limitation of the amount of nitrogen oxides released from the engine, and accordingly in a poorer fuel efficiency for the vehicle.

In addition, there is a risk that the higher fraction of nitrogen dioxide $NO_2$ also results in emissions of laughing gas $N_2O$.

These risks of a non-advantageous fraction of nitrogen monoxide $NO_2$ arising also exist due to the system's ageing. For example, the ratio $NO_2/NO_x$ may assume lower values when the system has aged, which may entail that a catalyst specification, which results in too high fractions of $NO_2/NO_x$ in a non-aged state, must be used to compensate for ageing.

There are also prior art exhaust treatment systems comprising a catalytic particulate filter SCRF, such as WO2014044318. A catalytic particulate filter is a filter comprising a catalytic coating, with the characteristic that the coating may be used for reduction of nitrogen oxides $NO_x$. However, these prior art exhaust treatment systems often experience problems relating to an insufficient soot oxidation in the catalytic filter SCRF. These problems are due at least partly to the fact that the reactions comprised in the reduction of nitrogen oxides $NO_x$ are faster than the reactions comprised in the soot oxidation.

There is accordingly a need for an optimization of the function in today's exhaust treatment systems.

Therefore, one objective of the present invention is to provide a method and a system which may provide a high performance, and a good function, under varying conditions.

The present invention provides for a treatment of an exhaust stream, resulting from a combustion in a combustion engine. Such exhaust stream comprises nitrogen oxides $NO_x$, in which at least nitrogen monoxide NO and nitrogen dioxide $NO_2$ are comprised. The exhaust stream passes through an exhaust treatment system connected to the combustion engine.

In the exhaust treatment system, a first oxidation of compounds comprising one or more of nitrogen, carbon and hydrogen in the exhaust stream occurs. Such oxidation is carried out by at first oxidation catalyst arranged in the exhaust treatment system.

According to the present invention, a value $(NO_{2\_1}/NO_{x\_1})_{det}$ for a ratio between a first amount of nitrogen dioxide $NO_{2\_1}$ leaving the first oxidation catalyst and a first amount of nitrogen oxides $NO_{x\_1}$ leaving the first oxidation catalyst is determined.

Based on this determined value $(NO_{2\_1}/NO_{x\_1})_{det}$ for the ratio, an active control of at least one parameter related to the combustion engine is then carried out, so that this active control impacts the ratio.

A first supply of a first additive into the exhaust stream is carried out with the use of a first dosage device, arranged downstream of the first oxidation catalyst.

This first additive is then used at a first reduction of the first amount of nitrogen oxides $NO_{x\_1}$, with the use of a catalytic reaction in a catalytic filter, arranged downstream of the first dosage device. This catalytic filter consists of a particulate filter with an at least partly catalytic coating with reduction characteristics. The catalytic filter is thus arranged to catch and oxidise soot particles, and to carry out the first reduction of the first amount of nitrogen oxides $NO_{x\_1}$.

An active control of at least one parameter related to the combustion engine is thus carried out, according to the present invention, based on the determined value $(NO_{2\_1}/NO_{x\_1})_{det}$ for the ratio. This active control is carried out in such a manner, that the ratio, and thus also a real value $NO_{2\_1}/NO_{x\_1}$ for the ratio, changes compared to the determined value $(NO_{2\_1}/NO_{x\_1})_{det}$ for the ratio.

This active control of at least one parameter related to the combustion engine, which is provided by the present invention, may result in an improved soot oxidation in the catalytic filter. More specifically, an improved passive nitrogen dioxide-based soot oxidation may be achieved by way of this active control of the engine, since the control may be carried out in such a manner, that a part of the nitrogen dioxide $NO_{2\_1}$ reaching the catalytic filter may be used to oxidise soot particles in the catalytic filter, instead of being consumed at the reduction with the catalytic coating in the filter.

In other words, the active control of at least one engine related parameter may be carried out in such a manner, that the first reduction of nitrogen oxides $NO_{x\_1}$ in the catalytic filter is limited, entailing that not all nitrogen dioxide $NO_{2\_1}$ in the exhaust stream is consumed at the first reduction, wherein the rest of the nitrogen dioxide which is not consumed may be used in the soot oxidation.

Oxidation catalysts have several features, which are important to the exhaust treatment system. One of these features is that the oxidation catalyst oxidises nitrogen monoxides NO occurring in the exhaust stream into nitrogen dioxide $NO_2$. The supply of nitrogen dioxide $NO_2$ is important to the nitrogen dioxide based soot oxidation in the filter and to the reduction of nitrogen oxides $NO_x$. The exhaust treatment system according to the present invention may therefore provide a good soot oxidation in the catalytic filter, thanks to availability of nitrogen dioxide $NO_{2\_1}$ after the first oxidation catalyst.

The active control of the combustion engine according to the present invention, means that the fraction of the total conversion of nitrogen oxides $NO_x$ occurring via a fast reaction path, that is to say via fast SCR, wherein the reduction occurs via reaction paths over both nitrogen oxide NO and nitrogen dioxide $NO_2$, may be increased for some operating modes. Thus, the volume requirements for the reducing system, and therefore for the entire exhaust treatment system, may be reduced. With a fast SCR, the reaction uses equal parts of nitrogen monoxide NO and nitrogen dioxide $NO_2$, which means that it is important to be able to control the molar ratio, $NO_2/NO_x$, towards a suitable value, for example a value close to 0.5 (50%).

The load on the catalytic filter and/or the reduction catalysts increases, in some embodiments, as a result of the increased level for nitrogen oxides $NO_x$. However, the filter and/or catalysts that carry out the reduction of nitrogen oxides $NO_x$ will have good conditions for coping with this load, since the increase occurs primarily at an approximate exhaust temperature of around 260-340° C., whereat the catalysts have rather a good performance.

By way of a suitably selected active control of the combustion engine, according to the present invention, the volume requirements relating to the reducing system may also be reduced, since the utilization is improved.

The use of the present invention may also result in a reduced consumption of additive. Additionally, emissions in the form of $NO_2$ from the vehicle may decrease.

The exhaust treatment system also becomes easier to control/regulate if the present invention is used, which means that a more accurate control of the supply of additive may be carried out.

Additionally, the active control of the combustion engine according to the present invention, which is here carried out primarily in order to optimise the $NO_x$-conversion, also results in a reduced fuel consumption for the vehicle as a positive by-effect.

The present invention may also advantageously be used in hybrid vehicles. The hybrid system may then provide the combustion engine with an increased flexibility for the control of the ratio $NO_2/NO_x$.

With the use of the present invention a better fuel optimization may be obtained for the vehicle, since there is thus potential to control the engine in a more fuel efficient manner, for example by increasing a first amount of nitrogen oxides $NO_{x\_1}$ reaching the catalytic filter, so that a higher efficiency for the engine is obtained. Thus, a performance gain and/or a reduced emission of carbon dioxide $CO_2$ may be obtained when the present invention is used.

With the use of the present invention, the fraction of nitrogen oxides $NO_x$ consisting of nitrogen dioxide $NO_2$ may be actively controlled, which is facilitated by an active control of the amount of nitrogen oxides $NO_x$ upstream of the first oxidation catalyst in the exhaust treatment system, which may for example comprise precious metals. This control of the ratio $NO_2/NO_x$ may, apart from advantages in catalytic performance, such as higher $NO_x$-conversion, also result in a possibility of reducing emissions of nitrogen dioxide $NO_2$, which result in a very poisonous and strong smelling emission. This may result in advantages at a potential future introduction of a separate legal requirement relating to nitrogen dioxide $NO_2$, through a possibility of reducing emissions of nitrogen dioxide $NO_2$.

BRIEF DESCRIPTION OF THE DRAWINGS

The invention will be illustrated in more detail below, along with the enclosed drawings, where similar references are used for similar parts, and where.

DETAILED DESCRIPTION OF THE INVENTION

Figure 1:
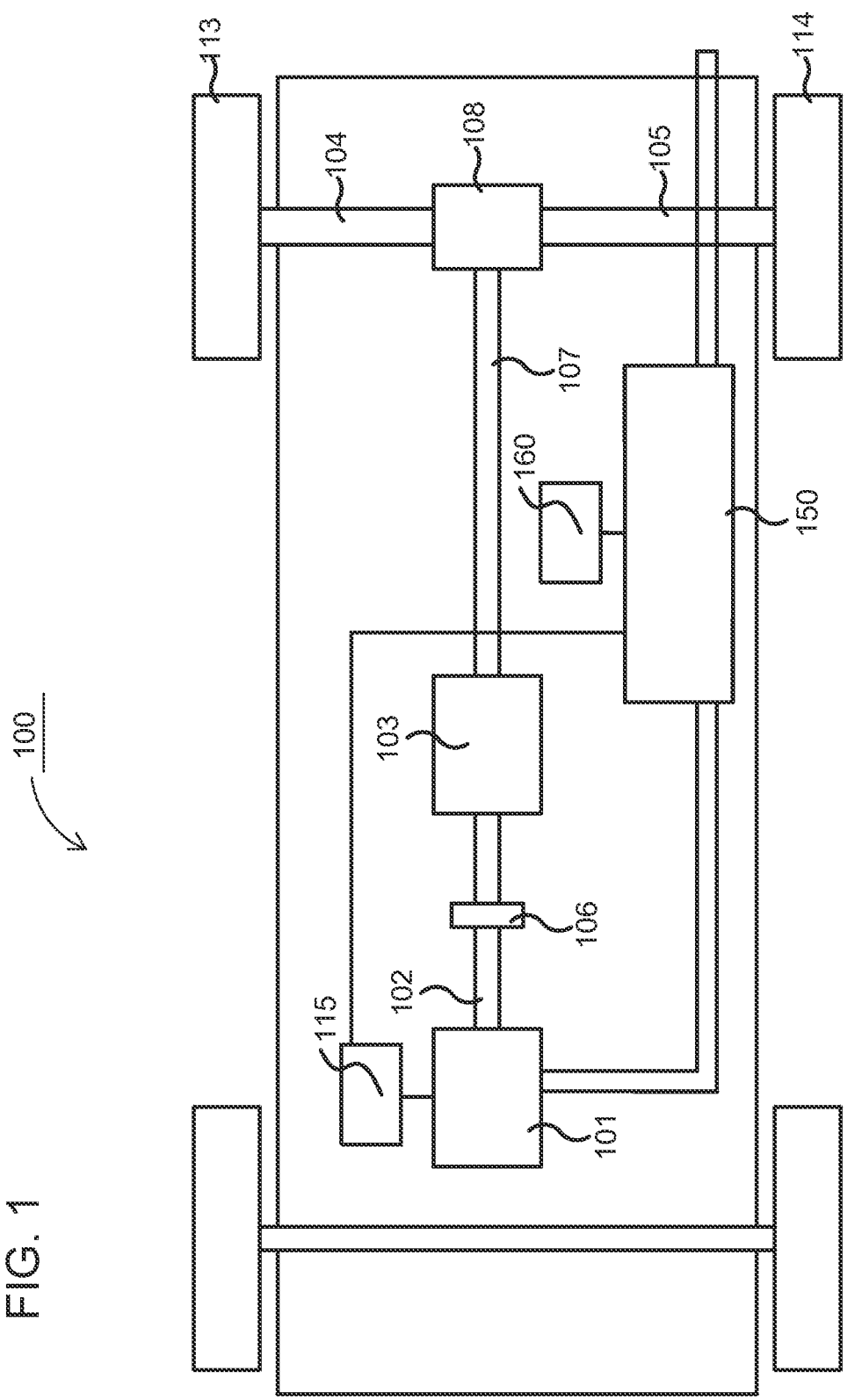
FIG. 1 shows an example vehicle which may comprise the present invention.

FIG. 1 schematically shows an example vehicle 100 comprising an exhaust treatment system 150, which may be an exhaust treatment system 150 according to one embodiment of the present invention. The power-train comprises a combustion engine 101, which in a customary manner, via an output shaft 102 on the combustion engine 101, usually via a flywheel, is connected to a gearbox 103 via a clutch 106.

The combustion engine 101 is controlled by the vehicle's control system via a control device 115, which may be connected to the exhaust treatment system 150 and/or its control device 160. Likewise, the clutch 106 and the gearbox 103 may be controlled by the vehicle's control system, with the help of one or more applicable control devices (not shown). Naturally, the vehicle's power-train may also be of another type, such as a type with a conventional automatic gearbox, of a type with a hybrid power-train, etc.

An output shaft 107 from the gearbox 103 drives the wheels 113, 114 via a final drive 108, such as e.g. a customary differential, and the drive shafts 104, 105 connected to said final drive 108.

The vehicle 100 also comprises an exhaust treatment system/exhaust purification system 150 for treatment/purification of exhaust emissions resulting from combustion in the combustion chambers, which may consist of cylinders, of the combustion engine 101. The exhaust treatment system 150 may be controlled by the vehicle's control system via a control device 160.

According to the present invention, a method is provided for the treatment of an exhaust stream, which results from a combustion in a combustion engine and comprises nitrogen oxides $NO_x$. Nitrogen oxides comprise at least nitrogen monoxide NO and nitrogen dioxide $NO_2$. The exhaust stream passes through an exhaust treatment system connected to the combustion engine.

Figure 2A:
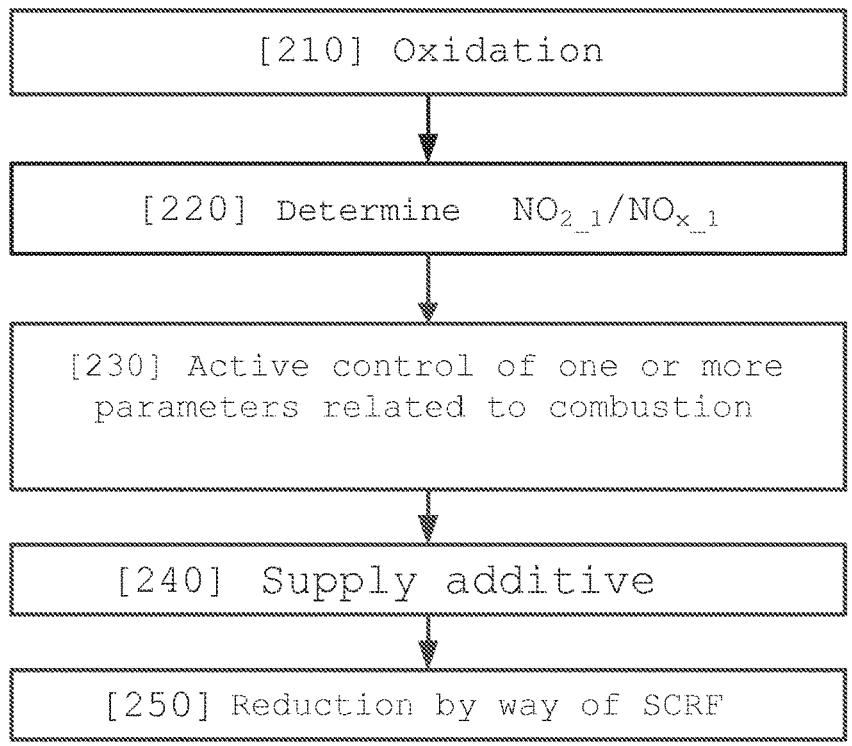
FIGS. 2a and 2b show a flow chart for the method for exhaust treatment according to the present invention.

This method may be illustrated with the flow chart in FIG. 2a.

In a first step 210 of the method, a first oxidation of compounds comprising one or more of nitrogen, carbon and hydrogen is carried out in the exhaust stream. Such oxidation is carried out by at first oxidation catalyst, arranged in the exhaust treatment system.

In a second step 220 of the method according to the present invention a value $(NO_{2\_1}/NO_{x\_1})_{det}$ for a ratio between a first amount of nitrogen dioxide $NO_{2\_1}$ leaving the first oxidation catalyst and reaching a catalytic filter SCRF, and the first amount of nitrogen oxides $NO_{x\_1}$ leaving the first oxidation catalyst and reaching the catalytic filter SCRF, is determined.

In a third step 230 of the method, an active control of at least one parameter related to the combustion engine is carried out. This at least one parameter may, for example, be related to a combustion in the combustion engine. This active control is carried out, according to the present invention, based on the determined value $(NO_{2\_1}/NO_{x\_1})_{det}$ for the ratio and is carried out in such a manner, that the active control impacts a real value $NO_{2\_1}/NO_{x\_1}$ for the ratio.

In a fourth step 240 of the method, the exhaust stream is supplied with a first additive, with the use of a first dosage device arranged downstream of the first oxidation catalyst.

In a fifth step 250 of the method, a first reduction of the first amount of nitrogen oxides $NO_{x\_1}$, flowing out from the first oxidation catalyst and reaching a catalytic filter arranged downstream of the first dosage device, is carried out. Such reduction is carried out through a catalytic reaction with an at least partly catalytic coating with reduction characteristics in the catalytic filter's SCRF and with the use of an additive.

With the use of the present invention, the combustion engine may be controlled to alter the amount of nitrogen oxides $NO_x$ emitted by it, if the determined value $(NO_{2\_1}/NO_{x\_1})_{det}$ for the ratio is not optimal. The value which is considered to be optimal depends on the objective of the active control of the combustion parameters. Such an objective may be to achieve an effective soot oxidation in the catalytic filter. Another objective may be to achieve an effective reduction of nitrogen oxides in the catalytic filter.

Availability of nitrogen dioxide $NO_{2\_1}$ in the exhaust stream at the catalytic filter is important, partly for the nitrogen dioxide-based soot oxidation in the filter, and partly for the reduction of nitrogen oxides $NO_{x\_1}$. The exhaust treatment system according to the present invention may therefore provide a good soot oxidation in the catalytic filter, since the availability of nitrogen dioxide $NO_2$ after the first oxidation catalyst may be decreased. Additionally, the reaction speed for the first reduction in the catalytic filter may be impacted by the ratio between nitrogen monoxide $NO_{\_1}$ and nitrogen dioxide $NO_{2\_1}$ in the exhaust stream reaching the catalytic filter. A more efficient first reduction in the catalytic filter may be obtained here, thanks to the previous oxidation of nitrogen oxides $NO_{\_1}$ into nitrogen dioxide $NO_{2\_1}$ in the first oxidation catalyst, in combination with the active control off the at least one parameter relating to the combustion engine.

According to one embodiment of the present invention, the first supply of the first additive and/or the at least one engine related parameter is controlled based on a distribution of the quota between nitrogen dioxide and nitrogen oxides at/upstream of the catalytic filter $NO_{2\_1}/NO_{x\_1}$, and/or at a reduction catalyst device $NO_{2\_2}/NO_{x\_2}$ arranged downstream, which may be in the form of determined values $(NO_{2\_1}/NO_{x\_1})_{det}$ and/or $(NO_{2\_2}/NO_{x\_2})_{det}$ for these ratios. The first supply of the first additive and/or the at least one engine related parameter may here, for example, be controlled based on a determined value $(NO_{2\_1}/NO_{x\_1})_{det}$ for the first ratio in such a way, that a fast reduction may be used at the reduction in the catalytic filter, since this occurs to as great an extent as possible via reaction paths over both nitrogen oxide NO and nitrogen dioxide $NO_2$.

According to one embodiment of the present invention, the active control of the at least one engine related parameter is carried out in such a way that the first amount of nitrogen oxides $NO_{x\_1}$ is obtained, if the determined value $(NO_{2\_1}/NO_{x\_1})_{det}$ for the ratio is greater than or equal to an upper threshold value $(NO_{2\_1}/NO_{x\_1})_{threshold\_high}$, $(NO_{2\_1}/NO_{x\_1})_{det} \geq (NO_{2\_1}/NO_{x\_1})_{threshold\_high}$. Thus, the active control results in an increase of the first amount of nitrogen oxides $NO_{x\_1}$ if the determined value $(NO_{2\_1}/NO_{x\_1})_{det}$ is too great. This increase of the first amount of nitrogen oxides $NO_{x\_1}$ in this case results in a decrease of the value for the ratio.

The increase of the first amount of nitrogen oxides $NO_{x\_1}$ may here entail that the first amount of nitrogen oxides $NO_{x\_1}$ actually reaching the catalytic filter after the active control, that is to say after impact on the ratio, is greater than the first amount of nitrogen oxides $NO_{x\_1}$ comprised in the determined value $(NO_{2\_1}/NO_{x\_1})_{det}$ for the ratio. The increase may also entail that the actual first amount of nitrogen oxides $NO_{x\_1}$ after the active control has a greater concentration of nitrogen oxides in the exhaust stream, than a concentration of nitrogen oxides corresponding to the determined value $(NO_{2\_1}/NO_{x\_1})_{det}$ for the ratio.

The oxidation of nitrogen oxides NO into nitrogen dioxide $NO_2$ over an oxidation catalyst DOC is impacted chemically and catalytically by the fact, that the catalytically oxidizing coating, comprising, for example, at least one precious metal such as platinum, is relatively constant at given conditions. Accordingly, the amount of nitrogen dioxide $NO_2$ produced by an oxidation catalyst DOC is relatively independent of the amount of nitrogen oxide NO supplied to the oxidation catalyst DOC.

Such an increase of the first amount of nitrogen oxides $NO_{x\_1}$ means that the real value for the ratio $NO_{2\_1}/NO_{x\_1}$ decreases, so that the fraction of the total conversion of nitrogen oxides $NO_x$, occurring via a fast reaction path, may be increased. Additionally, by way of the active control of the combustion engine, according to the present invention, the volume requirements relating to the catalyst may also be reduced, since the utilization is improved.

Thus, through this embodiment, the combustion engine is controlled to increase the first amount of nitrogen oxides $NO_{x\_1}$ emitted from the combustion engine and reaching the oxidation catalyst, and thus also flowing out of the oxidation catalyst and reaching the catalytic filter, if the determined value $(NO_{2\_1}/NO_{x\_1})_{det}$ for the ratio is too high. This increase of the amount of nitrogen oxides $NO_{x\_1}$ means that the value for the ratio $NO_{2\_1}/NO_{x\_1}$ decreases, which means that a more efficient reduction may be obtained with the catalytic filter.

The upper threshold value $(NO_{2\_1}/NO_{x\_1})_{threshold\_high}$, which, if exceeded, gives an active control of at least one engine related parameter achieving an increase of the first amount of nitrogen oxides $NO_{x\_1}$, has, according to one embodiment, a value depending on a representation of a temperature of the catalytic filter and/or of a reduction catalyst device arranged downstream. These representations of one or several temperatures may be based, for example, on measured, modelled and/or predicted temperatures in the exhaust treatment system, for example by using one or several temperature sensors described herein, which may be arranged in/at/on, upstream and/or downstream of the catalytic filter and/or the reduction catalyst device. The upper threshold value $(NO_{2\_1}/NO_{x\_1})_{threshold\_high}$ may, for example, have the value 45%, 50%, 60% or >65%.

According to one embodiment of the present invention, the active control of the at least one engine related parameter is carried out in such a manner, that the active control results in a decrease of the first amount of nitrogen oxides $NO_{x\_1}$ reaching the catalytic filter, if the determined value $(NO_{2\_1}/NO_{x\_1})_{det}$ for the ratio is less than or equal to a lower threshold value $(NO_{2\_1}/NO_{x\_1})_{threshold\_low}$, $(NO_{2\_1}/NO_{x\_1})_{det} \geq (NO_{2\_1}/NO_{x\_1})_{threshold\_low}$. This decrease may, for example, be viewed as though the first amount of nitrogen oxides $NO_{x\_1}$ actually reaching the catalytic filter after the active control, that is to say after impact of the ratio, is less than the first amount of nitrogen oxides $NO_{x\_1}$ comprised in the determined value $(NO_{2\_1}/NO_{x\_1})_{det}$ for the ratio. The decrease may also be viewed as though the first amount of nitrogen oxides $NO_{x\_1}$ actually reaching the catalytic filter after the active control impacting the ratio, has a lower concentration of nitrogen oxides in the exhaust stream than a concentration of nitrogen oxides corresponding to the determined value $(NO_{2\_1}/NO_{x\_1})_{det}$ for the ratio.

The lower threshold value $(NO_{2\_1}/NO_{x\_1})_{threshold\_low}$, which, if not reached, entails an active control resulting in a decrease of the first amount of nitrogen oxides $NO_{x\_1}$, has a value depending on a representation of a temperature over the catalytic filter and/or over a reduction catalyst device arranged downstream. These representations of one or several temperatures may be based, for example, on measured, modelled and/or predicted temperatures in the exhaust treatment system, for example by using one or several temperature sensors described herein, which may be arranged in/at/on, upstream and/or downstream of the catalytic filter and/or the reduction catalyst device. The lower threshold value $(NO_{2\_1}/NO_{x\_1})_{threshold\_low}$ may, for example, have a value corresponding to 50%, 45%, 30%, 20% or 10%.

As described above, according to the present invention an active control 230 of at least one parameter related to the combustion in the engine is carried out, in order to achieve a desirable value for the ratio $NO_{2\_1}/NO_{x\_1}$, between the first amount of nitrogen dioxide $NO_{2\_1}$ and the first amount of nitrogen oxides $NO_{x\_1}$ reaching the catalytic filter. This active control may be carried out in a number of different ways, according to different embodiments of the present invention.

According to a couple of embodiments of the present invention, the active control 230 comprises a selection of at least one injection strategy for the combustion engine.

According to one embodiment of the present invention, the timing of fuel injections into the respective cylinders in the combustion engine may be controlled in such a manner, that an increase or a decrease of the first amount of nitrogen oxides $NO_{x\_1}$ reaching the first oxidation catalyst, and therefore also the catalytic filter, is achieved.

An increase of the first amount of nitrogen oxides $NO_{x\_1}$ may be achieved by carrying out one or more of the injections earlier. This increase of the first amount of nitrogen oxides $NO_{x\_1}$ results in a reduction of the value for the ratio $NO_{2\_1}/NO_{x\_1}$.

Similarly, the timing of fuel injections into the respective cylinders in the combustion engine may be controlled, so that a decrease of the first amount of nitrogen oxides $NO_{x\_1}$ reaching the reduction catalyst device is achieved. This decrease may be achieved by postponing the timing of one or several of the injections. This decrease of the first amount of nitrogen oxides $NO_{x\_1}$ results in an increase of the value for the ratio $NO_{2\_1}/NO_{x\_1}$.

According to one embodiment of the present invention, the injection pressure for the fuel injections into the respective cylinders in the combustion engine may be controlled, so that an increase of the first amount of nitrogen oxides $NO_{x\_1}$ reaching the catalytic filter is achieved. This increase may be achieved by way of an increase of the injection pressure for one or several cylinders. This increase of the first amount of nitrogen oxides $NO_{x\_1}$ results in a reduction of the value for the ratio $NO_{2\_1}/NO_{x\_1}$.

Similarly, the injection pressure for the injections of fuel into the respective cylinders of the combustion engine may be controlled, so that a decrease of the first amount of nitrogen oxides $NO_{x\_1}$ reaching the catalytic filter is achieved. This decrease may be achieved by way of a lowering of the injection pressure for one or several cylinders. This decrease of the first amount of nitrogen oxides $NO_{x\_1}$ results in an increase of the value for the ratio $NO_{2\_1}/NO_{x\_1}$.

According to one embodiment of the present invention, an injection phasing for an injection of fuel into the respective cylinders may be controlled, so that an increase of the first amount of nitrogen oxides $NO_{x\_1}$ reaching the reduction catalyst device is achieved. The increase may here be achieved by way of controlling an injection phasing, so that it results in a relatively large pressure gradient. This increase of the first amount of nitrogen oxides $NO_{x\_1}$ results in a reduction of the value for the ratio $NO_{2\_1}/NO_{x\_1}$. Injection phasing, as the term is used herein, means how the injection changes over time, for example how the pressure for the injection changes over time. A measure related to injection phasing may, for example, be a time derivative for the cylinder pressure.

Similarly, an injection phasing for the injections of fuel into the respective cylinders may be controlled, so that a decrease of the first amount of nitrogen oxides $NO_{x\_1}$ reaching the catalytic filter is achieved. This decrease may be achieved by way of control of the injection phasing, so that it results in a relatively small pressure gradient with respect to the cylinder pressure. This decrease of the first amount of nitrogen oxides $NO_{x\_1}$ results in an increase of the value for the ratio $NO_{2\_1}/NO_{x\_1}$.

According to one embodiment of the present invention, the active control of the at least one engine related parameter comprises a control of a device for exchange gas recirculation (EGR). Combustion engines are supplied with air at an inlet, to achieve a gas mixture which is suitable for combustion, together with fuel that is also supplied to the engine. The combustion takes place in the engine's cylinders, wherein the gas mixture is burned. The combustion generates exhausts, which leave the engine at an outlet. An exhaust recirculation conduit may be arranged from the engine's outlet to its inlet, and, in this case, leads back a part of the exhausts from the outlet to the inlet. Thus, the suction losses at the air intake may be reduced, and the amount of nitrogen oxides $NO_x$ emitted from the engine may be adjusted. According to one embodiment of the present invention, the exhaust gas recirculation is reduced by the control, and in certain operating modes the exhaust gas recirculation is shut off completely.

According to one embodiment of the present invention an increase of the amount of nitrogen oxides $NO_{x\_1}$ reaching the catalytic filter may be achieved by decreasing a fraction of the exhaust stream, which is recirculated through the device for exhaust gas recirculation (EGR). This increase of the first amount of nitrogen oxides $NO_{x\_1}$ results in a reduction of the value for the ratio $NO_{2\_1}/NO_{x\_1}$.

Similarly, a decrease of the first amount of nitrogen oxides $NO_{x\_1}$ reaching the catalytic filter may be achieved by increasing a fraction of the exhaust stream, which is recirculated through the device for exhaust gas recirculation (EGR). This decrease of the first amount of nitrogen oxides $NO_{x\_1}$ results in an increase of the value for the ratio $NO_{2\_1}/NO_{x\_1}$.

The determined value $(NO_{2\_1}/NO_{x\_1})_{det}$ for the ratio between the first amount of nitrogen dioxide $NO_{2\_1}$ and the first amount of nitrogen oxides $NO_{x\_1}$ leaving, that is to say flowing out of, the first oxidation catalyst and reaching, that is to say flowing into, the catalytic filter, may, for example, consist of a measured, predicted and/or modelled value for the ratio, wherein the measurement, prediction and/or modelling may have regard to the current operating and/or driving mode, characteristics of the road section in which the vehicle is located, characteristics of the combustion engine and/or characteristics of the fuel used to drive the combustion engine. The measurement, prediction and/or modelling may also have regard to how the vehicle is driven, such as to the torque requested by a driver and/or a cruise control, and to the driver's driving style. A predicted value may, for example, be determined based on a representation of a road section ahead of the vehicle, which may be based, for example, on positioning information, such as GPS information, and map data.

The determined value $(NO_{2\_1}/NO_{x\_1})_{det}$ for the ratio between the first amount of nitrogen dioxide $NO_{2\_1}$ and the first amount of nitrogen oxides $NO_{x\_1}$ reaching the catalytic filter may also consist of a measured value, which is measured with the use of one or several $NO_x$-sensors, and/or $NO_2$-sensors, arranged in the exhaust treatment system.

In this document, the invention is often described as active controls resulting in increases or decreases of the amount of nitrogen oxides $NO_x$ reaching the first oxidation catalyst, and therefore also the catalytic filter.

A person skilled in the art will realize that a method for treatment of an exhaust stream according to the present invention may also be implemented in a computer program, which when executed in a computer will cause the computer to execute the method. The computer program usually consists of a part of a computer program product 403, where the computer program product comprises a suitable non-volatile/permanent/persistent/durable digital storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 4:
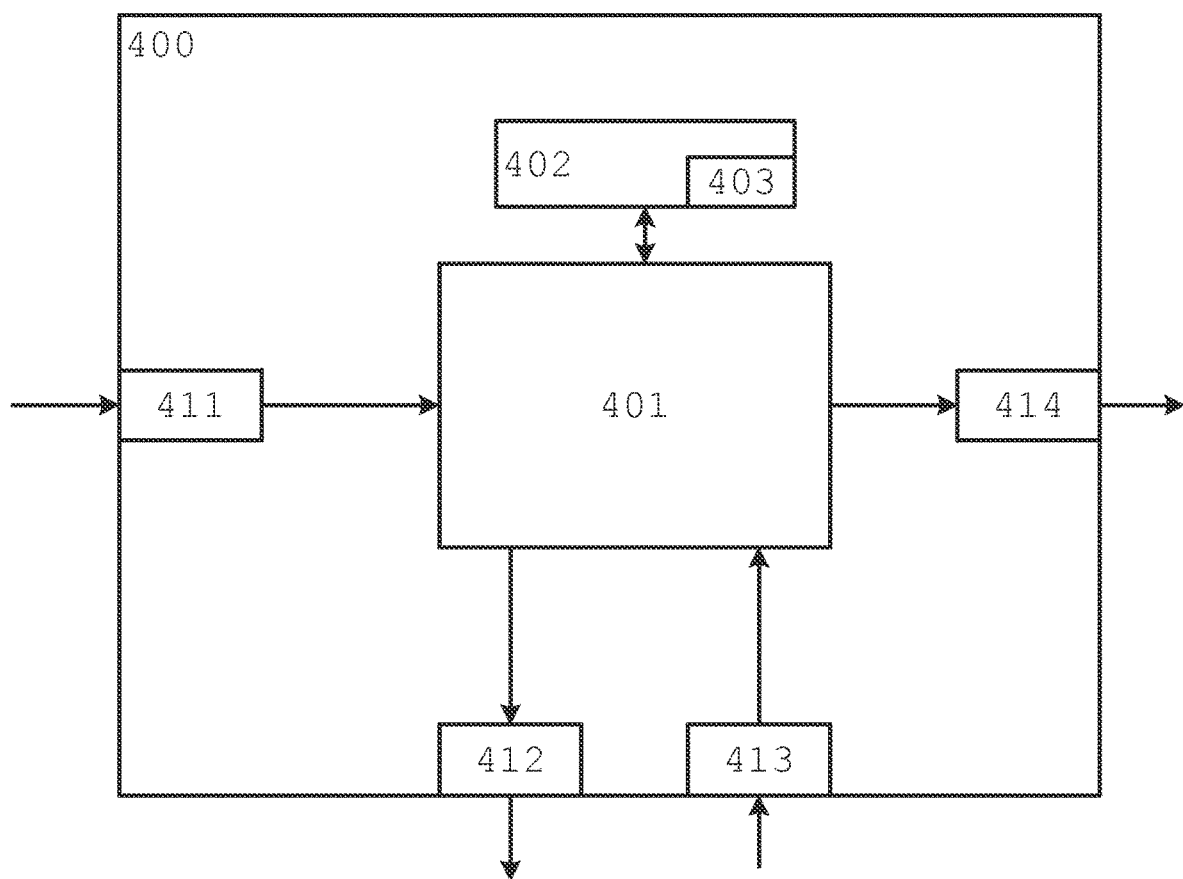
FIG. 4 shows a control device, in which a method according to the present invention may be implemented.

FIG. 4 schematically shows a control device 400. The control device 400 comprises a calculation device 401, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation device 401 is connected to a memory unit 402 installed in the control device 400, providing the calculation device 401 with e.g. the stored program code, and/or the stored data which the calculation device 401 needs in order to be able to carry out calculations. The calculation device 401 is also set up to store interim or final results of calculations in the memory device 402.

Further, the control device 400 is equipped with devices 411, 412, 413, 414 for receiving and sending of input and output signals, respectively. These input and output signals may contain wave shapes, pulses or other attributes, which may be detected as information by the devices 411, 413 for the receipt of input signals, and may be converted into signals that may be processed by the calculation device 401. These signals are then provided to the calculation device 401. The devices 412, 414 for sending output signals are arranged to convert the calculation result from the calculation unit 401 into output signals for transfer to other parts of the vehicle's control system, and/or the component(s) for which the signals are intended, for example the first and/or second dosage devices.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation device 401, and that the above-mentioned memory may consist of the memory device 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than shown in FIGS. 1, 3 and 4, as is well known to a person skilled in the art within the technology area.

The present invention, in the embodiment displayed, is implemented in the control device 400. The invention may, however, also be implemented wholly or partly in one or several other control devices, already existing in the vehicle, or in a control device dedicated to the present invention.

Here, and in this document, control devices are often described as being arranged to carry out steps in the method according to the invention. This also comprises that the devices are adapted and/or set up to carry out these method steps. For example, these control devices may correspond to different groups of instructions, for example in the form of program code, which is fed into, and used by a processor, when the respective control device is active/used to implement the respective method steps.

Figure 3:
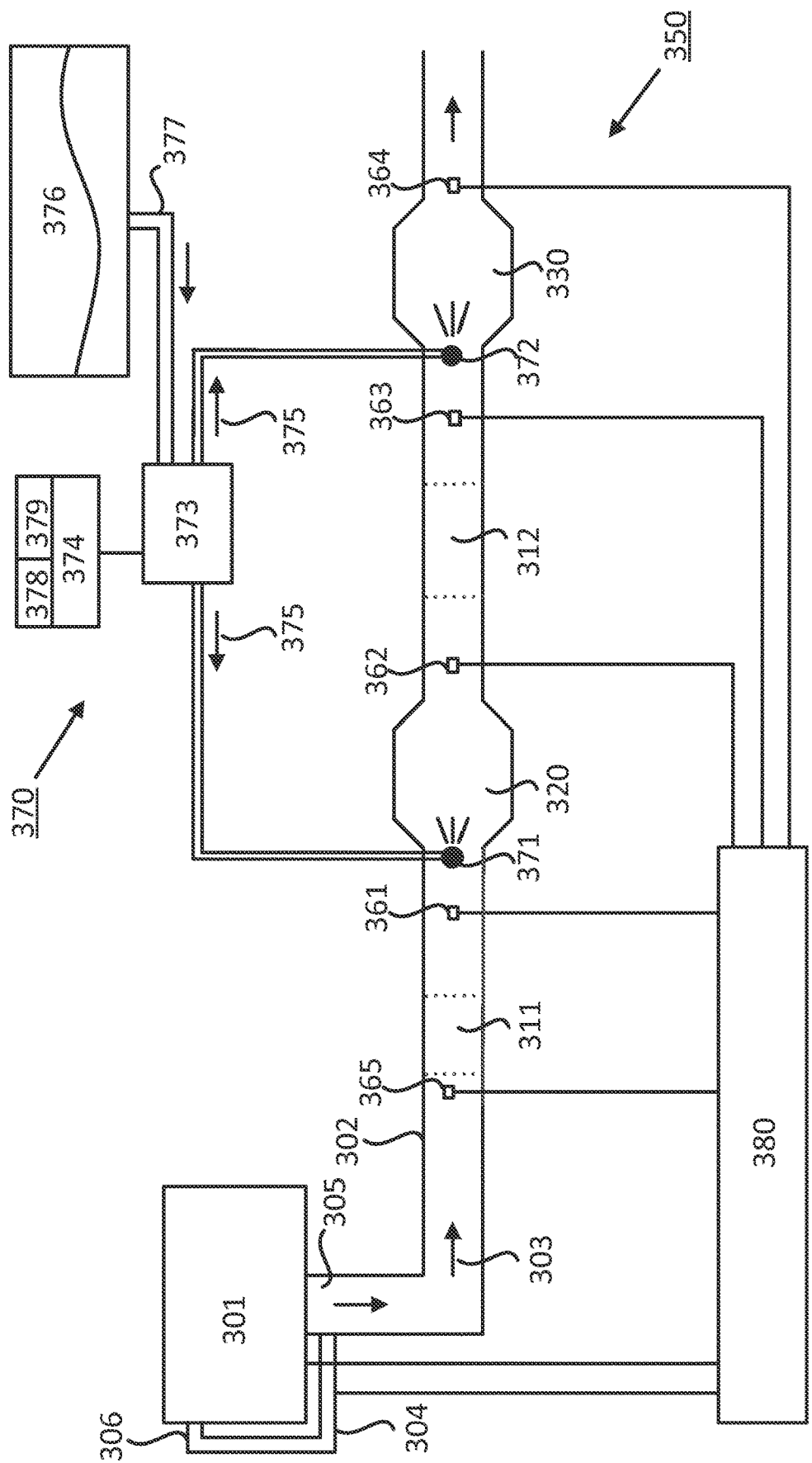
FIG. 3 shows an example of an exhaust treatment system according to the present invention.

According to one aspect of the present invention, an exhaust treatment system is provided, arranged for the treatment of an exhaust stream, which results from a combustion in a combustion engine. The exhaust stream comprises nitrogen oxides $NO_x$, in which at least nitrogen monoxide NO and nitrogen dioxide $NO_2$ are comprised. FIG. 3 schematically shows two non-limiting examples of exhaust treatment systems 350, in which the method according to the present invention may be used. In the exhaust treatment system 350 displayed in FIG. 3, an exhaust conduit 302 is connected to a combustion engine 301, which produces an exhaust stream 303, reaching the components in the exhaust treatment system 350 via the exhaust conduit 302.

The exhaust treatment system 350 according to the present invention comprises a first oxidation catalyst 311, arranged in the exhaust treatment system 350, in order to carry out an oxidation 210 of compounds comprising one or more of nitrogen, carbon, and hydrogen in the exhaust stream 303 from the combustion engine 301.

The exhaust treatment system 350 according to the present invention also comprises a first dosage device 371, arranged downstream of the first oxidation catalyst 311, in order to carry out a first supply 240 of a first additive into the exhaust stream 303 reaching a catalytic filter 320, arranged downstream of the dosage device.

The catalytic filter 320 consists of a particulate filter with an at least partly catalytic coating with reduction characteristics. The catalytic filter 320 is arranged for catching and oxidizing of soot particles in the exhaust stream, and is arranged to carry out a first reduction 250 of the first amount of nitrogen oxides $NO_{x\_1}$ reaching the catalytic filter 320. The catalytic reaction in the filter here uses the first additive, supplied into the exhaust stream 303 by the first dosage device 371.

The exhaust treatment system 350 according to the present invention also comprises a control device 380, arranged to provide an above described determination 220 of a value $(NO_{2\_1}/NO_{x\_1})_{det}$ for a ratio between a first amount of nitrogen dioxide $NO_{2\_1}$ and a first amount of nitrogen oxides $NO_{x\_1}$ leaving the first oxidation catalyst 311, and therefore reaching the catalytic filter 320. The control device 380 is also arranged to carry out an active control 230 of at least one parameter related to the combustion engine 301, based on this determined value $(NO_{2\_1}/NO_{x\_1})_{det}$ for the ratio. This active control 230 is arranged to impact the ratio.

According to one embodiment of the present invention, the exhaust treatment system 350 also comprises a second dosage device 372, arranged downstream of the catalytic filter 320, in order to provide a second supply of a second additive into the exhaust stream 303. According to this embodiment, the exhaust treatment system 350 also comprises a reduction catalyst device 330, arranged downstream of the second dosage device 372, in order to carry out a second reduction of a second amount of nitrogen oxides $NO_{x\_2}$ reaching the reduction catalyst device 330. This second reduction potentially uses remaining first additive and/or the second additive. With the use of this embodiment of the present invention an improved soot oxidation in the catalytic filter may be obtained. Specifically, an improved passive nitrogen dioxide based soot oxidation may be achieved, since there are two possibilities of a reduction of nitrogen oxides in the exhaust treatment system, a first reduction in the catalytic filter and a second reduction in the reduction catalyst device. Accordingly, a part of the nitrogen dioxide $NO_{2\_1}$ reaching the catalytic filter may be used to oxidize soot particles in the catalytic filter, instead of being consumed at the reduction with the catalytic coating in the filter.

In other words, the first reduction of nitrogen oxides $NO_{x\_1}$ in the catalytic filter may be limited, so that not all nitrogen dioxide $NO_{2\_1}$ in the exhaust stream is consumed at the first reduction, entailing that the residue of nitrogen dioxide that has not been consumed may be used at the soot oxidation. This is possible since the exhaust treatment system, thanks to comprising a reduction catalyst device downstream of the catalytic filter, may provide a required/desired/requested reduction of nitrogen oxides $NO_x$. This ensures that a required/desired/requested amount/level of nitrogen oxides $NO_x$ is emitted from the exhaust treatment system.

A required impact/reduction/catalytic function referred to in this document may be related to a maximum permitted emission of nitrogen oxides $NO_x$, which may be based, for example, on emission requirements in the Euro VI emission standard or in other existing and/or future emission standards.

This embodiment also has an advantage in that two cooperating dosage devices are used in combination for the administration of a reductant, for example urea, which relieves and facilitates mixture and potential evaporation of the reductant, since the injection of the reductant is divided between two physically separate positions. This reduces the risk of the reductant cooling down the exhaust treatment system locally, which may potentially form deposits at the positions where the reductant is injected, or downstream of such positions.

The control of the supply of the first additive may, according to one embodiment, be carried out based on one or more characteristics and/or operating conditions for the catalytic filter 320. The control of the supply of the first additive may also be controlled based on one or several characteristics and/or operating conditions for the reduction catalyst device 330. The control of the supply of the first additive may also be controlled based on a combination of characteristics and/or operating conditions for the catalytic filter and for the reduction catalyst device.

Similarly, the control of the supply of the second additive may be carried out based on one or several characteristics and/or operating conditions for the reduction catalyst device 330. The control of supply of the second additive may, according to one embodiment, be carried out based on one or several characteristics and/or operating conditions for the catalytic filter 320. The control of the supply of the second additive may also be controlled based on a combination of characteristics and/or operating conditions for the catalytic filter 320 and for the reduction catalyst device 330.

The above mentioned characteristics for the catalytic filter 320, and/or the reduction catalyst device 330, may be related to one or more catalytic characteristics for the catalytic filter 320, and/or the reduction catalyst device 330, a catalyst type for the catalytic filter 320 and/or the reduction catalyst device 330, a temperature interval, within which the catalytic filter 320, and/or the reduction catalyst device 330, is active, and a coverage of ammonia for the catalytic filter 320, and/or the reduction catalyst device 330.

According to one embodiment of the present invention, the exhaust treatment system 350 also comprises a second oxidation catalyst 312, arranged downstream of the catalytic filter 320, in order to carry out a second oxidation of compounds comprising one or more of nitrogen, carbon and hydrogen in said exhaust stream 303. The exhaust treatment system 350 also comprises a second dosage device 372, arranged downstream of the second oxidation catalyst 312, in order to carry out a second supply of a second additive into the exhaust stream 303. The exhaust treatment system here also comprises a reduction catalyst device 330, arranged downstream of the second dosage device 372, in order to carry out a second reduction of a second amount of nitrogen oxides $NO_{x\_2}$ reaching the reduction catalyst device 330. This second reduction in this case uses the second additive and/or potential residues of the first additive. The first oxidation catalyst $DOC_1$ 311 and/or the second oxidation catalyst $DOC_2$ 312 is at least partially coated with a catalytically oxidizing coating, wherein this oxidizing coating may comprise at least one precious metal, for example, platinum. With the use of this embodiment of the present invention, an improved soot oxidation in the catalytic filter may be obtained. Specifically, an improved passive nitrogen dioxide-based soot oxidation may be achieved, since there are two possibilities of a reduction of nitrogen oxides in the exhaust treatment system, a first reduction in the catalytic filter and a second reduction in the reduction catalyst device. Thus, a part of the nitrogen dioxide $NO_2$ reaching the catalytic filter may be used to oxidize soot particles in the catalytic filter, instead of being consumed at the reduction with the catalytic coating in the filter. Thus, the first reduction of nitrogen oxides $NO_x$ in the catalytic filter may in this case be limited, so that not all nitrogen dioxide $NO_2$ in the exhaust stream is consumed at the first reduction, entailing that the residue of nitrogen dioxide that is not consumed may be used at the soot oxidation. This is possible since the exhaust treatment system, thanks to also comprising a reduction catalyst device downstream of the catalytic filter, may provide a required reduction of nitrogen oxides $NO_x$ in total.

Additionally, when this embodiment is used, an overall good reduction of nitrogen dioxide $NO_x$ may be provided with the exhaust treatment system 350, since the catalytic filter is preceded by a first oxidation catalyst 311 arranged upstream, and the reduction catalyst device is preceded by a second oxidation catalyst 312 arranged upstream. The reaction speed for the first reduction in the catalytic filter 320 and for the second reduction in the reduction catalyst device 330 is impacted by the ratio between nitrogen monoxide NO and nitrogen dioxide $NO_2$ in the exhaust stream. Accordingly, a more efficient first and second reduction in the catalytic filter 320 and in the reduction catalyst device 330, respectively, may be obtained thanks to the previous oxidation of nitrogen oxides NO into nitrogen dioxide $NO_2$ in the first 311 and the second 312 oxidation catalyst, respectively.

Additionally, the use of the two oxidizing steps in the first $DOC_1$ 311 and second $DOC_2$ 312 oxidation catalysts in the exhaust treatment system, results in an increased fraction of nitrogen dioxide $NO_2$ in the exhaust stream, when the exhaust stream reaches the catalytic filter SCRF and the reduction catalyst device, respectively, so that the fraction of the total conversion of nitrogen oxides $NO_x$ occurring via a fast reaction path, that is to say via fast SCR, whereat the reduction occurs via reaction paths over both nitrogen monoxide NO and nitrogen dioxide $NO_2$, is increased.

This embodiment also has an advantage in that two cooperating dosage devices are used in combination for the administration of a reductant/additive, for example urea, which relieves and facilitates mixture and potential evaporation of the additive, since the injection of the additive is divided between two physically separate positions. This reduces the risk of the additive cooling down the exhaust treatment system locally, which may potentially form deposits at the positions where the additive is injected, or downstream of such positions.

According to one embodiment of the present invention, the reduction catalyst device 330 comprises a selective catalytic reduction catalyst device (SCR).

The exhaust treatment system 350 may, according to one embodiment, have the innovative configuration $DOC_1$-SCRF-SCR. That is to say, the exhaust treatment system 350 comprises a first oxidation catalyst $DOC_1$, followed downstream by a catalytic filter SCRF, that is to say a particulate filter with an at least partly catalytic coating with reduction characteristics, followed downstream by a selective catalytic reduction catalyst SCR. As mentioned above, the use of both the catalytic filter SCRF and the selective catalytic reduction catalyst SCR in the exhaust treatment system 350 facilitates the omission of a slip-catalyst SC in the exhaust treatment system 350 for some applications, which reduces the manufacturing cost for the vehicle. The first oxidation catalyst $DOC_1$ may also be used to generate heat in the exhaust treatment system according to the present invention, which heat may be used at regeneration of an exhaust treatment component, such as, for example, a reduction catalyst device, or the catalytic filter in the exhaust treatment system. The two possible reductions of nitrogen oxides in the exhaust treatment system provided by the embodiment, the first reduction in the catalytic filter and the second reduction in the reduction catalyst device, mean, as mentioned above, that a part of the nitrogen dioxide $NO_2$ reaching the catalytic filter may be used to oxidize soot particles in the catalytic filter.

The exhaust treatment system 350 may, according to one embodiment, also have the innovative configuration $DOC_1$-SCRF-$DOC_2$-SCR. That is to say, the exhaust treatment system 350 comprises a first oxidation catalyst $DOC_1$, followed downstream by a catalytic filter SCRF, that is to say a particulate filter with an at least partly catalytic coating with reduction characteristics, followed downstream by a second oxidation catalyst $DOC_2$, followed downstream by a selective catalytic reduction catalyst SCR. As mentioned above, the use of both the catalytic filter SCRF and the selective catalytic reduction catalyst SCR in the exhaust treatment system 350 facilitates the omission of a slip-catalyst SC in the exhaust treatment system 350 for some applications, which reduces the manufacturing cost for the vehicle. The use of the two oxidizing steps in the first $DOC_1$ and second $DOC_2$ oxidation catalysts in the exhaust treatment system may result in an increased fraction of nitrogen dioxide $NO_2$ in the exhaust stream, when the exhaust stream reaches the catalytic filter SCRF and the reduction catalyst device, respectively. The first oxidation catalyst $DOC_1$ may also be used to generate heat in the exhaust treatment system according to the present invention, which heat may be used at regeneration of an exhaust treatment component, such as, for example, a reduction catalyst device, or the catalytic filter in the exhaust treatment system.

According to one embodiment of the present invention, the reduction catalyst device 330 comprises a selective catalytic reduction catalyst (SCR), followed downstream by a slip-catalyst (SC), wherein said slip-catalyst (SC) is arranged to oxidize a residue of additive and/or to assist the selective catalytic reduction catalyst device (SCR) with an additional reduction of nitrogen oxides $NO_x$ in the exhaust stream 303.

The exhaust treatment system 350 may, according to one embodiment, have the innovative configuration $DOC_1$-SCRF-$DOC_2$-SCR-SC. That is to say, the exhaust treatment system 350 comprises a first oxidation catalyst $DOC_1$, followed downstream by a catalytic filter SCRF, that is to say a particulate filter with an at least partly catalytic coating with reduction characteristics, followed downstream by a second oxidation catalyst $DOC_2$, followed downstream by a selective catalytic reduction catalyst SCR, followed downstream by a slip-catalyst SC. This exhaust treatment system 350 facilitates emission levels for nitrogen oxides $NO_x$ close to zero, since the reduction catalyst SCR may be made to work hard by, for example, increased administration of the second additive, since it is followed downstream by the slip-catalyst SC. The use of the slip-catalyst SC results in additionally improved performance for the system, since additional slip may be taken care of by the slip-catalyst SC. According to one embodiment of the present invention, the slip-catalyst SC is multifunctional, and therefore reduces nitrogen oxides $NO_x$ by using residues of the additive, and also oxidizes the residues of the additive. Additionally, the use of the two oxidizing steps in the first $DOC_1$ and second $DOC_2$ oxidation catalysts in the exhaust treatment system results in an increased fraction of nitrogen dioxide $NO_2$ in the exhaust stream, when the exhaust stream reaches the catalytic filter SCRF and the reduction catalyst device, respectively, so that the fraction of the total conversion of nitrogen oxides $NO_x$ occurring via a fast reaction path, that is to say via fast SCR, whereat the reduction occurs via reaction paths over both nitrogen monoxide NO and nitrogen dioxide $NO_2$, is increased. The first oxidation catalyst $DOC_1$ may also be used to generate heat in the exhaust treatment system according to the present invention, which heat may be used at regeneration of an exhaust treatment component, such as, for example, a reduction catalyst device, or the filter SCRF in the exhaust treatment system. The two possible reductions of nitrogen oxides in the exhaust treatment system provided by the embodiment, the first reduction in the catalytic filter and the second reduction in the reduction catalyst device, mean that a part of the nitrogen dioxide $NO_{2\_1}$ reaching the catalytic filter may be used to oxidize soot particles in the catalytic filter, instead of being consumed at the reduction with the catalytic coating in the filter. Thus, the first reduction of nitrogen oxides $NO_{x\_1}$ in the catalytic filter may be limited, so that not all nitrogen dioxide $NO_2$ in the exhaust stream is consumed at the first reduction, entailing that the residue of nitrogen dioxide that has not been consumed may be used at the soot oxidation. This is possible since the exhaust treatment system, thanks to comprising a reduction catalyst device downstream of the catalytic filter may provide a required reduction of nitrogen oxides $NO_x$ in total. Thus, with the use of the present invention an improved passive nitrogen dioxide-based soot oxidation in the catalytic filter may be obtained.

The exhaust treatment system 350 may, according to one embodiment, have the innovative configuration $DOC_1$-SCRF-SCR-SC. That is to say, the exhaust treatment system 350 comprises a first oxidation catalyst $DOC_1$, followed downstream by a catalytic filter SCRF, that is to say a particulate filter with an at least partly catalytic coating with reduction characteristics, followed downstream by a selective catalytic reduction catalyst SCR, followed downstream by a slip-catalyst SC. This exhaust treatment system 350 facilitates emission levels for nitrogen oxides $NO_x$ close to zero, since the reduction catalyst SCR may be made to work hard by, for example, increased administration of the second additive, since it is followed downstream by the slip-catalyst SC. The use of the slip-catalyst SC results in additionally improved performance for the system, since additional slip may be taken care of by the slip-catalyst SC. According to one embodiment of the present invention, the slip-catalyst SC is multifunctional, and therefore reduces nitrogen oxides $NO_x$ by using residues of the additive, and also oxidizes the residues of the additive. Additionally, the use of the two oxidizing steps in the first $DOC_1$ and second $DOC_2$ oxidation catalysts in the exhaust treatment system results in an increased fraction of nitrogen dioxide $NO_2$ in the exhaust stream, when the exhaust stream reaches the catalytic filter SCRF and the reduction catalyst device, respectively. The first oxidation catalyst $DOC_1$ may also be used to generate heat in the exhaust treatment system according to the present invention, which heat may be used at regeneration of an exhaust treatment component, such as for example a reduction catalyst device, or the filter in the exhaust treatment system. The two possible reductions of nitrogen oxides in the exhaust treatment system provided by the embodiment, the first reduction in the catalytic filter and the second reduction in the reduction catalyst device, mean that a part of the nitrogen dioxide $NO_2$ reaching the catalytic filter may be used to oxidize soot particles in the catalytic filter. This configuration is compact in relation to its performance/utilization.

According to one embodiment of the invention, a first and/or a second hydrolysis catalyst, which may consist of substantially any suitable hydrolysis coating, and/or at least one mixer, may be arranged in connection with the first 371 and second 372 dosage device, respectively. The first and/or second hydrolysis catalyst, and/or the at least one mixer, are then used to increase the speed of the decomposition of urea into ammonia, and/or to mix the additive with the emissions, and/or to vaporize the additive.

The exhaust treatment system 350 may also equipped with one or several sensors, such as one or several $NO_x$—, $NO_2$— and/or temperature sensors 361, 362, 363, 364, 365, arranged, for example, at the inlet to the first 311 and/or second 312 oxidation catalyst, at the inlet and/or at the outlet to the catalytic filter 320, at the inlet to the reduction catalyst device 330 and/or at the outlet from the reduction catalyst device 330, for determination of nitrogen oxides and/or temperatures in the exhaust treatment system. The temperature sensors 361, 362, 363, 364, 365 may thus be arranged upstream and/or downstream of the components 311, 320, 312, 330 in the exhaust treatment system 350. Temperature sensors may also be arranged in/at/on one or more of the components 311, 320, 312, 330 in the exhaust treatment system 350.

The exhaust treatment system 350 may, according to one embodiment, comprise at least one external injector supplying the first 311, and/or the second 312 oxidation catalyst, with hydrocarbons HC.

The engine may in this case also be seen as an injector, supplying the first 311, and/or the second 312 oxidation catalyst, with hydrocarbons HC, whereat the hydrocarbons HC may be used to generate heat.

The exhaust treatment system 350 also comprises, according to one embodiment, the above mentioned control device 380, arranged to provide/carry out a determination 220 of a value $(NO_{2\_1}/NO_{x\_1})_{det}$ for a ratio between the first amount of nitrogen dioxide $NO_{2\_1}$ reaching the catalytic filter 320, and the first amount of nitrogen oxides $NO_{x\_1}$ leaving the first oxidation catalyst 311, and thus also reaching the catalytic filter 320 as described above. The control device 380 is also arranged to carry out an active control 230 of at least one parameter related to the combustion engine 301, such as, for example, related to a combustion in the combustion engine, based on this determined value $(NO_{2\_1}/NO_{x\_1})_{det}$ for the ratio. This active control 230 is carried out in such a manner, that the value of the ratio $NO_{2\_1}/NO_{x\_1}$ changes. The control device 380 may be arranged to base the control on signals from one or several sensors in the exhaust treatment system, among others on the one or several of the $NO_x$—, $NO_2$— and/or the temperature sensors 361, 362, 363, 364, 365.

As a non-limiting example, the control may here be carried out in such a way that the administration of the first additive very rarely corresponds to an $NO_x$-conversion exceeding the value for twice the ratio between the fraction of nitrogen dioxide $NO_2$ and the fraction of nitrogen oxides $NO_x$, that is to say that the dosage of the first additive corresponds to an $NO_x$-conversion less than $(NO_2/NO_x)*2$. If, for example, $NO_2/NO_x=30\%$, the administration of the first additive may be controlled to correspond to an $NO_x$-conversion smaller than 60% ($2*30\%=60\%$), for example an $NO_x$-conversion equal to approximately 50%, which would guarantee that the reaction speed over the catalytic filter 320 is fast, and that 5% of the nitrogen dioxide $NO_2$ remains for $NO_2$-based soot oxidation through the catalytic filter 320.

According to one embodiment of the present invention, the control device 380 is arranged to also determine a second value $(NO_{2\_2}/NO_{x\_2})_{det}$ for a ratio between the second amount of nitrogen dioxide $NO_{2\_2}$ and the second amount of nitrogen oxides $NO_{x\_2}$ reaching the reduction catalyst device 330. The control device 380 is also arranged to carry out the active control 230 of the at least one engine related parameter, based on the above described determined value $(NO_{2\_1}/NO_{x\_1})_{det}$ and on the determined second value $(NO_{2\_2}/NO_{x\_2})_{det}$ of the ratio. This may result in a more robust control in, for example, operating modes where it is difficult to reliably determine this value $(NO_{2\_1}/NO_{x\_1})_{det}$. This embodiment is illustrated in FIG. 2b, in which the method steps are carried out in an at least partly different order than the one displayed in FIG. 2a.

Figure 2B:
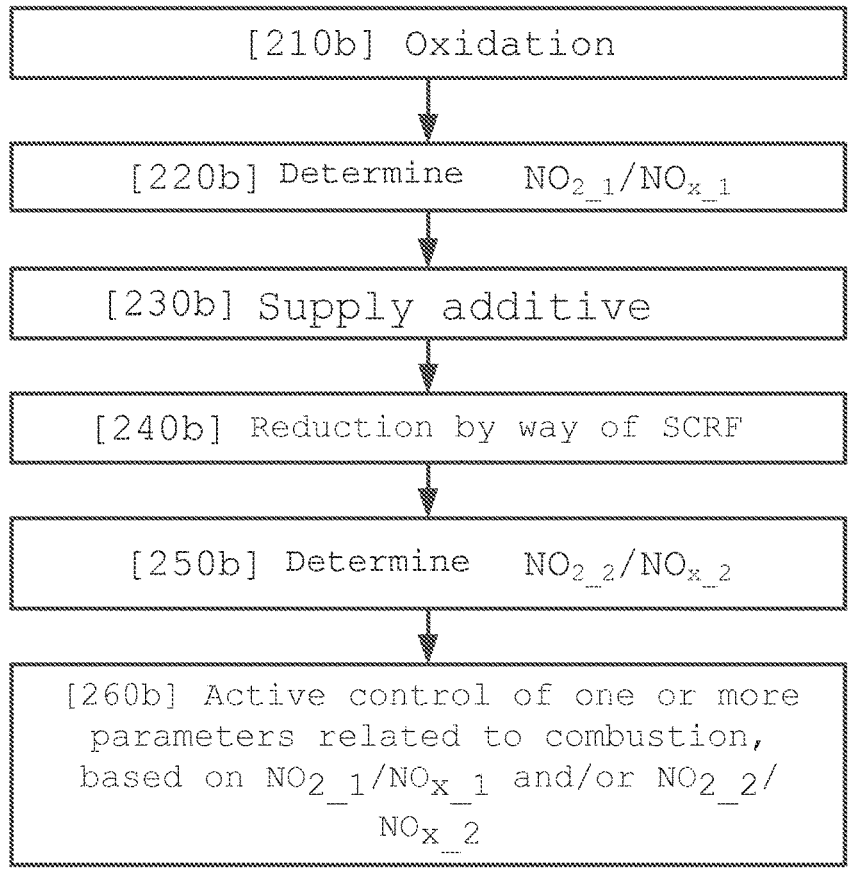

In the method displayed in FIG. 2b, a first step 210b, a first oxidation of compounds comprising one or more of nitrogen, carbon and hydrogen is carried out in the exhaust stream. Such oxidation is carried out by a first oxidation catalyst, arranged in the exhaust treatment system.

In a second step 220b of the method, a value $(NO_{2\_1}/NO_{x\_1})_{det}$ is determined for a ratio between a first amount of nitrogen dioxide $NO_{2\_1}$ leaving the first oxidation catalyst and reaching a catalytic filter SCRF, and the first amount of nitrogen oxides $NO_{x\_1}$ leaving the first oxidation catalyst and reaching the catalytic filter SCRF.

In a third step 230b of the method, the exhaust stream is supplied with a first additive with the use of a first dosage device, arranged downstream of the first oxidation catalyst.

In a fourth step 240b of the method, a first reduction of the first amount of nitrogen oxides $NO_{x\_1}$ flowing out from the first oxidation catalyst and reaching a catalytic filter, arranged downstream of the first dosage device, is carried out. Such reduction is carried out through a catalytic reaction with an at least partly catalytic coating with reduction characteristics in the catalytic filter's SCRF, and with the use of the first additive.

In a fifth step 250b of the method, a value $(NO_{2\_2}/NO_{x\_2})_{det}$ is determined for a ratio between a second amount of nitrogen dioxide $NO_{2\_2}$ reaching the reduction catalyst device 330, arranged downstream of the catalytic filter, and the second amount of nitrogen oxides $NO_{x\_2}$ reaching the reduction catalyst device.

In a sixth step 260b of the method, an active control of at least one parameter related to the combustion engine is carried out. This at least one parameter may, for example, be related to a combustion in the combustion engine. This active control is carried out, according to the present invention, based on the determined first $(NO_{2\_1}/NO_{x\_1})_{det}$ and/or second $(NO_{2\_2}/NO_{x\_2})_{det}$ values for the ratios and is carried out in such a manner, that the active control impacts the corresponding actual values for the ratios.

As described above, according to the present invention an active control 230 is carried out of at least one parameter related to the combustion in the engine 301, in order to achieve a desirable value for the ratio between the first amount of nitrogen dioxide $NO_{2\_1}$ and the first amount of nitrogen oxides $NO_{x\_1}$ reaching the catalytic filter, and/or corresponding amounts $NO_{2\_2}/NO_{x\_2}$ reaching the reduction catalyst device. This active control may be carried out in a number of different ways, according to different embodiments of the present invention.

The active control of the at least one parameter related to the combustion in the engine 301 may, according to one embodiment of the present invention, comprise a selection of at least one injection strategy for the combustion engine 301. In FIG. 3 the control device 380 is schematically drawn as connected to the engine 301. This connection means that the control device 380 is arranged to better be able to control the injection of fuel into the combustion engine's cylinders, either directly or via an engine control device 115 (FIG. 1).

According to one embodiment of the present invention, a timing for an injection of fuel into the respective cylinders in the combustion engine 301 may be controlled by the control device 380 to occur earlier, so that an increase of the first amount of nitrogen oxides $NO_{x\_1}$ reaching the catalytic filter 320 is achieved by pushing forward the timing of the injection. Similarly, a decrease of the first amount of nitrogen oxides $NO_{x\_1}$ reaching the reduction catalytic filter 320 may be achieved by postponing the timing of the injection.

According to one embodiment of the present invention, as described above, the injection pressure for the injections of fuel into the respective cylinders in the combustion engine may be controlled by the control device 380 in such a manner, that an increase of the injection pressure is achieved for one or several cylinders, wherein an increase of the first amount of nitrogen oxides $NO_{x\_1}$ reaching the catalytic filter 320 is achieved. Similarly, the injection pressure for the injections of fuel into the respective cylinders of the combustion engine 301 may be controlled in such a manner, that a decrease of the first amount of nitrogen oxides $NO_{x\_1}$ reaching the catalytic filter 320 is achieved.

According to one embodiment of the present invention, as described above, the injection phasing for an injection of fuel into the respective cylinders may be controlled by the control device 380 in such a manner, that a relatively large pressure gradient is obtained, wherein an increase of the first amount of nitrogen oxides $NO_{x\_1}$ reaching the catalytic filter 320 is achieved. Similarly, the injection phasing may be controlled in such a manner, that a relatively small cylinder pressure gradient is obtained, wherein a decrease of the first amount of nitrogen oxides $NO_{x\_1}$ reaching the filter 320 is achieved.

As described above, according to one embodiment of the present invention, the active control of the at least one combustion related parameter may comprise the control device 380 controlling a device for exchange gas recirculation (EGR) 304. This is schematically illustrated in FIG. 3 by way of a connection between the control device 380, and the exchange gas recirculation device 304. This connection illustrates that the control device 380 may, either directly, via, for example, an engine control device 115 (FIG. 1), control the fraction of the exhaust stream 303 that is recirculated from the engine's outlet 305 to its inlet 306. For example, the control device 380 may here be arranged to control a damper or similar in the EGR-recirculation device 304, which impacts the amount of exhausts recirculated to the inlet 306.

According to one embodiment of the present invention, the control device 380 may be arranged to reduce a fraction of the exhaust stream, which is recirculated through the device for exhaust recirculation (EGR), so that an increase of the first amount of nitrogen oxides $NO_{x\_1}$ reaching the catalytic filter 320 is achieved. According to one embodiment, the recirculation may be reduced to zero. Similarly, an increase of a fraction of the exhaust stream, which is recirculated through the exchange gas recirculation device (EGR), may provide for a decrease of the first amount of nitrogen oxides $NO_{x\_1}$ reaching the filter 320.

According to one embodiment of the present invention, the first, and/or the second additive, comprises ammonia $NH_3$ or urea, or a composition from which ammonia may be generated/formed/released. This additive may for example consist of AdBlue. The first and the second additive may be of the same type, or may be of different types.

According to one embodiment of the present invention, the exhaust treatment system 350 comprises a system 370 for supply of additive, which comprises at least one pump 373 arranged to supply the first 371 and the second 372 dosage devices in the exhaust treatment system 350 with additive, that is to say, for example, ammonia or urea.

One example of such a system 370 for supply of additive is displayed schematically in FIG. 3, where the system comprises the first dosage device 371 and the second dosage device 372, which are arranged upstream of the catalytic filter SCRF 320, and upstream of the reduction catalyst device 330, respectively. The first and second dosage devices 371, 372, often consisting of dosage nozzles administering additive to, and mixing such additive with the exhaust stream 303, are supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized that the additive may be in liquid form and/or gaseous form. Where the additive is in liquid form, the pump 373 is a liquid pump, and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive, and at least one tank and one pump are set up to supply gaseous additive.

According to one embodiment of the invention, the at least one pump 373 comprises a joint pump, which feeds both the first 371 and the second 372 dosage device with the first and the second additive, respectively. According to another embodiment of the invention, the at least one pump comprises a first and a second pump, which feed the first 371 and the second 372 dosage device, respectively, with the first and the second additive, respectively. The specific function of the additive system 370 is well described in prior art technology, and the exact method for the injection of additive is therefore not described in any further detail herein. Generally, however, the temperature at the point of injection/SCR-catalyst should be above a lower threshold temperature to avoid precipitates and formation of unwanted by-products, such as ammonium nitrate $NH_4NO_3$. An example of a value for such a lower threshold temperature may be approximately 180° C. According to one embodiment of the invention, the system 370 for supply of additive comprises a dosage control device 374, arranged to control the at least one pump 373, in such a manner that the additive is supplied to the exhaust stream. The dosage control device 374 comprises, according to one embodiment, a first pump control device 378 arranged to control the at least one pump 373, in such a manner that a first dosage of the first additive is supplied to the exhaust stream 303, via the first dosage device 371. The dosage control device 374 also comprises a second pump control device 379, arranged to control the at least one pump 373, in such a manner that a second dosage of the second additive is supplied to the exhaust stream 303, via the second dosage device 372.

The first and second additives usually consist of the same type of additive, for example urea. However, according to one embodiment of the present invention, the first additive and the second additive may be of different types, for example urea and ammonia, which means that the dosage upstream of each one of the catalytic filter SCRF 320 and the reduction catalyst device 330, and accordingly also the function for each of the catalytic filter SCRF 320 and the reduction catalyst device 330, may be optimized also with respect to the type of additive. If different types of additive are used, the tank 376 comprises several sub-tanks, which contain the different respective types of additive. One or several pumps 373 may be used to supply the different types of additive to the first dosage device 371 and the second dosage device 372. As mentioned above, the one or several tanks, and the one or several pumps, are adapted according to the state of the additive, that is to say according to whether the additive is gaseous or liquid.

The one or several pumps 373 are thus controlled by a dosage control device 374, which generates control signals for the control of supply of additive, so that a desired amount is injected into the exhaust stream 303 with the help of the first 371 and the second 372 dosage device, respectively, upstream of the first 331 and the second 332 device, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

The exhaust treatment system 350 in which the present invention is implemented may have a large number of designs. As mentioned above, the exhaust treatment system may generally have any appearance whatsoever, as long as it comprises at least one first oxidation catalyst 311, followed by a catalytic filter SCRF 320, followed by a reduction catalyst device 330, and where the combustion engine 301 may be controlled by a control device 380 to change the first amount of nitrogen oxides NO x_1 emitted from the engine.

In this document, a selective catalytic reduction catalyst SCR means a traditional SCR-catalyst (Selective Catalytic Reduction). SCR catalysts usually use an additive, often ammonia $NH_3$, or a composition from which ammonia may be generated/formed, which is used for the reduction of nitrogen oxides $NO_x$ in the exhausts. The additive is injected into the exhaust stream resulting from the combustion engine, upstream of the catalyst as described above. The additive added to the catalyst is adsorbed (stored) in the catalyst, in the form of ammoniac $NH_3$, so that a redox-reaction may occur between nitrogen oxides $NO_x$ in the exhausts and ammonia $NH_3$ available via the additive.

In this document, a slip-catalyst SC means a catalyst which is arranged to oxidize additive, and/or to assist a selective catalytic reduction catalyst SCR with a reduction of nitrogen oxides $NO_x$ in the exhaust stream.

The system according to the present invention may be arranged to perform all of the method embodiments described above and in the claims, so that the system for the respective embodiments obtains the above described advantages for the respective embodiments.

A person skilled in the art will also realize that the above system may be modified according to the different embodiments of the method according to the invention. In addition, the invention relates to a motor vehicle 100, for example a truck or a bus, comprising at least one system for treatment of an exhaust stream.

The present invention is not limited to the embodiments of the invention described above, but relates to and comprises all embodiments within the scope of the enclosed independent claims.

The invention claimed is:

1. A method for treatment of an exhaust stream, which results from a combustion in a combustion engine, passes through an exhaust treatment system and comprises nitrogen oxides $NO_x$, wherein said nitrogen oxides NOx comprise nitrogen monoxide NO and nitrogen dioxide $NO_2$, said method comprising:
    a first oxidation of compounds comprising one or more of nitrogen, carbon and hydrogen in said exhaust stream, wherein said first oxidation is carried out by a first oxidation catalyst, arranged in said exhaust treatment system;
    a determination of a value $(NO_{2\_1}/NO_{x\_1})_{det}$ for a ratio between a first amount of nitrogen dioxide $NO_{2\_1}$ and a first amount of nitrogen oxides $NO_{x\_1}$ leaving said first oxidation catalyst;
    an active control of at least one parameter related to operation of said combustion engine based on said determined value $(NO_{2\_1}/NO_{x\_1})_{det}$ for said ratio, wherein said active control impacts on said ratio depending on whether to achieve an effective soot oxidation in a catalytic filter, which consists of a particulate filter with at least partly catalytic coating with reduction characteristics and is arranged downstream of a first dosage device, or to achieve an effective reduction of nitrogen oxides in the catalytic filter;
    a first supply of a first additive into said exhaust stream with the use of the first dosage device, arranged downstream of said first oxidation catalyst; and
    a first reduction of said first amount of nitrogen oxides $NO_{x\_1}$ via a catalytic reaction in the catalytic filter, which is arranged for catching and oxidizing of soot particles, and to carry out said first reduction of said first amount of nitrogen oxides $NO_{x\_1}$, and wherein said catalytic reaction uses said first additive.

2. A method according to claim 1, wherein said determined value $(NO_{2\_1}/NO_{x\_1})_{det}$ for said ratio consists of one from among the group:
    a predicted value;
    a modelled value; and
    a measured value.

3. A method according to claim 1, further comprising:
    a second supply of a second additive into said exhaust stream with the use of a second dosage device, arranged downstream of said catalytic filter; and a second reduction of a second amount of nitrogen oxides $NO_{x\_2}$ reaching a reduction catalyst device arranged downstream of said second dosage device, wherein said second reduction uses said first and/or second additive.

4. A method according to claim 1, further comprising:
a second oxidation of compounds comprising one or more of nitrogen, carbon and hydrogen in said exhaust stream, wherein said second oxidation is carried out by a second oxidation catalyst, arranged downstream of said catalytic filter;
a second supply of a second additive into said exhaust stream with the use of a second dosage device, arranged downstream of said second oxidation catalyst; and
a second reduction of a second amount of nitrogen oxides $NO_{x\_2}$ reaching a reduction catalyst device, arranged downstream of said second dosage device, wherein said second reduction uses said first and/or second additive.

5. A method according to claim 1, wherein said active control of said at least one parameter comprises a control of a device for exhaust recirculation.

6. A method according to claim 5, wherein an increase of said first amount of nitrogen oxides $NO_{x\_1}$ is achieved by way of decreasing a fraction of said exhaust stream, which is recirculated through said device for exhaust recirculation.

7. A method according to claim 5, wherein a decrease of said first amount of nitrogen oxides $NO_{x\_1}$ is achieved by way of increasing a fraction of said exhaust stream, which is recirculated through said device for exhaust recirculation.

8. A method according to claim 1, wherein said active control of said at least one parameter related to said combustion engine is carried out in such a manner, that said control results in an increase of said first amount of nitrogen oxides $NO_{x\_1}$, if said determined value $(NO_{2\_1}/NO_{x\_1})_{det}$ for said ratio is greater than or equal to an upper threshold value $(NO_{2\_1}/NO_{x\_1})_{threshold\_high}$, $(NO_{2\_1}/NO_{x\_1})_{det} \geq (NO_{2\_1}/NO_{x\_1})_{threshold\_high}$.

9. A method according to claim 8, wherein said increase of said first amount of nitrogen oxides $NO_{x\_1}$ entails that said first amount of nitrogen oxides $NO_{x\_1}$, after said impact on said ratio, is greater than said first amount of nitrogen oxides $NO_{x\_1}$ that is comprised in said determined value $(NO_{2\_1}/NO_{x\_1})_{det}$ for said ratio.

10. A method according to claim 8, wherein said increase of said first amount of nitrogen oxides $NO_{x\_1}$ entails that said first amount of nitrogen oxides $NO_{x\_1}$, after said impact on said ratio, has a greater concentration of nitrogen oxides in said exhaust stream than a concentration of nitrogen oxides corresponding to said determined value $(NO_{2\_1}/NO_{x\_1})_{det}$ for said ratio.

11. A method according to claim 8, wherein said upper threshold value $(NO_{2\_1}/NO_{x\_1})_{threshold\_high}$ has a value corresponding to one from among the group of:
45%;
50%;
60%; and
>65%.

12. A method according to claim 8, wherein said upper threshold value $(NO_{2\_1}/NO_{x\_1})_{threshold\_high}$ has a value, which depends on a representation of a temperature of said catalytic filter and/or of a reduction catalyst device, arranged downstream of said catalytic filter.

13. A method according to claim 1, wherein said active control of said at least one parameter related to a combustion in said combustion engine is carried out in such a manner, that said control results in a decrease of said first amount of nitrogen oxides $NO_{x\_1}$, if said determined value $(NO_{2\_1}/NO_{x\_1})_{det}$ for said ratio is smaller than or equal to a lower threshold value $(NO_{2\_1}/NO_{x\_1})_{threshold\_low}$, $(NO_{2\_1}/NO_{x\_1})_{det} \leq (NO_{2\_1}/NO_{x\_1})_{threshold\_low}$.

14. A method according to claim 13, wherein said reduction of said first amount of nitrogen oxides $NO_{x\_1}$ entails that said first amount of nitrogen oxides $NO_{x\_1}$, after said impact on said ratio, is less than said first amount of nitrogen oxides $NO_{x\_1}$ comprised in said determined value $(NO_{2\_1}/NO_{x\_1})_{det}$ for said ratio.

15. A method according to claim 13, wherein said decrease of said first amount of nitrogen oxides $NO_{x\_1}$ entails that said first amount of nitrogen oxides $NO_{x\_1}$, after said impact on said ratio, has a lower concentration of nitrogen oxides in said exhaust stream than a concentration of nitrogen oxides corresponding to said determined value $(NO_{2\_1}/NO_{x\_1})_{det}$ for said ratio.

16. A method according to claim 13, wherein said lower threshold value $(NO_{2\_1}/NO_{x\_1})_{threshold\_low}$ has a value corresponding to one from among the group:
50%;
45%;
30%;
20%; and
10%.

17. A method according to claim 13, wherein said lower threshold value $(NO_{2\_1}/NO_{x\_1})_{threshold\_low}$ has a value, which depends on a representation of a temperature of said catalytic filter and/or of a reduction catalyst device, arranged downstream of said catalytic filter.

18. A method according to claim 1, wherein said active control of said at least one parameter comprises a selection of at least one injection strategy for said combustion engine.

19. A method according to claim 18, wherein said at least one injection strategy comprises a control of a timing $\alpha$ for an injection of fuel into respective cylinders comprised in said combustion engine.

20. A method according to claim 19, wherein an increase of said first amount of nitrogen oxides $NO_{x\_1}$ is achieved by way of pushing forward said timing $\alpha$ for said injection.

21. A method according to claim 19, wherein a decrease of said first amount of nitrogen oxides $NO_{x\_1}$ is achieved by way of postponing said timing $\alpha$ for said injection.

22. A method according to claim 18, wherein said at least one injection strategy comprises a control of an injection pressure for an injection of fuel into the respective cylinders in said combustion engine.

23. A method according to claim 22, wherein an increase of said first amount of nitrogen oxides $NO_{x\_1}$ is achieved by way of an increase of said injection pressure.

24. A method according to claim 22, wherein a decrease of said first amount of nitrogen oxides $NO_{x\_1}$ is achieved by way of a decrease of said injection pressure.

25. A method according to claim 18, wherein said at least one injection strategy comprises a control of an injection phasing for an injection of fuel into the respective cylinders in said combustion engine.

26. A method according to claim 25, wherein an increase of said first amount of nitrogen oxides $NO_{x\_1}$ is achieved by way of control of an injection phasing that achieves a relatively large cylinder pressure gradient.

27. A method according to claim 25, wherein a decrease of said first amount of nitrogen oxides $NO_{x\_1}$ is achieved by way of control of an injection phasing that achieves a relatively small cylinder pressure gradient.

28. A computer program product comprising computer program code stored on a non-transitory computer-readable medium, said computer program product for treatment of an exhaust stream, which results from a combustion in a combustion engine, passes through an exhaust treatment system and comprises nitrogen oxides NOx, wherein said nitrogen oxides NOx comprise nitrogen monoxide NO and nitrogen dioxide $NO_2$, said computer program product comprising computer instructions to cause one or more computer processors to perform the following operations:

a first oxidation of compounds comprising one or more of nitrogen, carbon and hydrogen in said exhaust stream, wherein said first oxidation is carried out by a first oxidation catalyst, arranged in said exhaust treatment system;

a determination of a value $(NO_{2\_1}/NO_{x\_1})_{det}$ for a ratio between a first amount of nitrogen dioxide $NO_{2\_1}$ and a first amount of nitrogen oxides $NO_{x\_1}$ leaving said first oxidation catalyst;

an active control of at least one parameter related to operation of said combustion engine based on said determined value $(NO_{2\_1}/NO_{x\_1})_{det}$ for said ratio, wherein said active control impacts on said ratio depending on whether to achieve an effective soot oxidation in a catalytic filter, which consists of a particulate filter with at least partly catalytic coating with reduction characteristics and is arranged downstream of a first dosage device, or to achieve an effective reduction of nitrogen oxides in the catalytic filter;

a first supply of a first additive into said exhaust stream with the use of the first dosage device, arranged downstream of said first oxidation catalyst; and a first reduction of said first amount of nitrogen oxides $NO_{x\_1}$ via a catalytic reaction in the catalytic filter, arranged downstream of said first dosage device, which is arranged for catching and oxidizing of soot particles, and to carry out said first reduction of said first amount of nitrogen oxides $NO_{x\_1}$, and wherein said catalytic reaction uses said first additive.

29. An exhaust treatment system arranged for treatment of an exhaust stream resulting from a combustion in a combustion engine and comprising nitrogen oxides NOx, wherein said nitrogen oxides NOx comprise nitrogen monoxide NO and nitrogen dioxide $NO_2$, said system comprising:

a first oxidation catalyst arranged in said exhaust treatment system, in order to oxidize compounds comprising one or more of nitrogen, carbon, and hydrogen in said exhaust stream;

a first dosage device, arranged downstream said first oxidation catalyst, in order to carry out a first supply of a first additive into said exhaust stream;

a catalytic filter, arranged downstream of said first dosage device, wherein said catalytic filter consists of a particulate filter with an at least partly catalytic coating with reduction characteristics, which is arranged for catching and oxidizing of soot particles, and to carry out a first reduction of a first amount of nitrogen oxides $NO_{x\_1}$ leaving said first oxidation catalyst, and wherein a catalytic reaction for said first reduction uses said first additive; and a control device arranged to provide:

a determination of a value $(NO_{2\_1}/NO_{x\_1})_{det}$ for a ratio between a first amount of nitrogen dioxide $NO_{2\_1}$ and the first amount of nitrogen oxides $NO_{x\_1}$ leaving said first oxidation catalyst; and an active control of at least one parameter related to operation of the combustion engine based on said determined value $(NO_{2\_1}/NO_{x\_1})_{det}$ for said ratio, wherein said active control impacts said ratio depending on whether to achieve an effective soot oxidation in the catalytic filter, or to achieve an effective reduction of nitrogen oxides in the catalytic filter.

30. An exhaust treatment system according to claim 29, further comprising:

a second oxidation catalyst, arranged downstream of said catalytic filter, in order to carry out a second oxidation of compounds comprising one or more of nitrogen, carbon and hydrogen in said exhaust stream;

a second dosage device, arranged downstream of said second oxidation catalyst, in order to carry out a second supply of a second additive into said exhaust stream; and a reduction catalyst device, arranged downstream of said second dosage device, in order to carry out a second reduction of a second amount of nitrogen oxides $NO_{x\_2}$ reaching said reduction catalyst device, wherein said second reduction uses said first and/or second additive.

31. An exhaust treatment system according to claim 29, further comprising:

a second dosage device, arranged downstream of said catalytic filter, in order to carry out a second supply of a second additive into said exhaust stream; and a reduction catalyst device, arranged downstream of said second dosage device, in order to carry out a second reduction of a second amount of nitrogen oxides $NO_{x\_2}$ reaching said reduction catalyst device, wherein said second reduction uses said first and/or second additive.

32. An exhaust treatment system according to claim 31, wherein said reduction catalyst device comprises one from among the group of:

a selective catalytic reduction catalyst (SCR);

a selective catalytic reduction catalyst (SCR), followed downstream by a slip-catalyst (SC), wherein said slip-catalyst (SC) is arranged to oxidize a residue of additive and/or to assist said selective catalytic reduction catalyst (SCR) with an additional reduction of nitrogen oxides NOx in said exhaust stream; and a slip-catalyst (SC), which is arranged primarily for reduction of nitrogen oxides NOx and secondarily for oxidation of additive in said exhaust stream.

* * * * *